United States Patent
Rakshit et al.

(10) Patent No.: US 10,548,366 B2
(45) Date of Patent: Feb. 4, 2020

(54) NAVIGATION USING MICROFLUIDICS

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/834,772

(22) Filed: Dec. 7, 2017

(65) Prior Publication Data
US 2019/0174862 A1    Jun. 13, 2019

(51) Int. Cl.
*H04B 3/36*    (2006.01)
*A43B 3/00*    (2006.01)
(Continued)

(52) U.S. Cl.
CPC ............ *A43B 3/0015* (2013.01); *A43B 13/14* (2013.01); *G01C 21/00* (2013.01)

(58) Field of Classification Search
CPC ..... A43B 3/0015; A43B 13/14; A43B 3/0005; A43B 23/026; A43B 23/0215;
(Continued)

(56) References Cited

U.S. PATENT DOCUMENTS 8,917,167 B1 * 12/2014 Selker .................... G06F 3/016
340/407.1
9,613,056 B2    4/2017 Ma et al.
(Continued)

FOREIGN PATENT DOCUMENTS

CN    205585398    9/2016

OTHER PUBLICATIONS

Gertz, Toe-Tickling Shoes Let You Navigate the City by Touch, MIT researcher's project replaces smartphone maps with cloud-connected insoles, Popular Science, Apr. 25, 2014, pp. 1-3.
(Continued)

*Primary Examiner* — Anh V La
(74) *Attorney, Agent, or Firm* — Damion Josephs; Edell, Shapiro & Finnan, LLC

(57) ABSTRACT

A navigation system includes microfluidics, a piezoelectric charger, and a transceiver paired with a network connected mobile computing device sending walking navigation instructions to the navigation system. The instructions are received by the transceiver and rendered as an embossed line using the microfluidics. The embossed line is felt by a user and interpreted as a navigation instruction. Other position information, such as upcoming obstacles, gradients, and route outline, can be portrayed as an embossed line to a user using the microfluidics. Optionally, the navigation system includes one or more pressure sensors providing pressure measurements to the mobile computing device for determining the gait of a user. The analyzed pressure measurements are received by the transceiver and rendered as one or more projecting objects by the microfluidics at locations with improper applied pressure. Present invention embodiments may be utilized for guidance of visually impaired persons, and for monitoring a user's gait.

20 Claims, 11 Drawing Sheets

(51) Int. Cl.
*A43B 13/14* (2006.01)
*G01C 21/00* (2006.01)

(58) Field of Classification Search
CPC ..... A43B 23/24; A43B 1/0027; A43B 3/0078;
A43B 3/242; A43B 23/0205; A43B
23/0245; G01C 21/00; G09B 21/003;
G06F 3/011; G06F 3/016; B81C 1/00119;
A41D 27/00; A41D 27/08; B44C 5/00;
G09F 21/02; G09F 13/24; G02B 5/24;
G02B 26/004; Y10T 137/87169; Y10T
156/10
USPC ......... 340/407.1, 4.12, 693.5; 36/43, 28, 88,
36/29, 25 R
See application file for complete search history.

(56) References Cited

U.S. PATENT DOCUMENTS

| | | | |
|---|---|---|---|
| 9,747,781 B2 | 8/2017 | Whitney et al. | |
| 2009/0247909 A1 | 10/2009 | Mukumoto | |
| 2011/0153197 A1 | 6/2011 | Song | |
| 2011/0242316 A1 | 10/2011 | Guerrero | |
| 2014/0137965 A1* | 5/2014 | Truitt | A41D 27/08 137/596 |
| 2014/0266570 A1 | 9/2014 | Sharma et al. | |
| 2014/0277632 A1* | 9/2014 | Walker | G01L 1/2206 700/91 |
| 2015/0277563 A1* | 10/2015 | Huang | G06F 3/016 715/702 |
| 2015/0378434 A1 | 12/2015 | Baskaran | |
| 2017/0142501 A1 | 5/2017 | Jakobsson | |
| 2017/0178471 A1 | 6/2017 | Levesque et al. | |
| 2017/0225033 A1 | 8/2017 | Czaja | |
| 2017/0245594 A1 | 8/2017 | Truitt et al. | |
| 2018/0189567 A1* | 7/2018 | Maheriya | G06T 7/536 |

OTHER PUBLICATIONS

Schneider, Walk This Way: Let Your Shoes Tell You Where to Go, NPR, All Tech Considered, Tech, Culture and Connection, May 26, 2016, https://www.npr.org/sections/alltechconsidered/2016/05/26/479344614/walk-this-way-let-your-shoes-tell-you-where-to-go.

Velazquez et al., A Shoe-Integrated Tactile Display for Directional Navigation, 2009 IEEE/RSJ International Conference on Intelligent Robots and Systems, Oct. 11-15, 2009, St. Louis, USA, pp. 1235-1240.

Schirmer et al, Shoe Me the Way: A Shoe-Based Tactile Interface for Eyes-Free Urban Navigation, MobileHCI'15, Aug. 24-27, Copenhagen, Denmark, pp. 327-336.

Morris, A Shoe-Integrated Sensor System for Wireless Gait Analysis and Real-Time Therapeutic Feedback, submitted to the Harvard-MIT Division of Health Sciences and Technology at the Massachusetts Institute of Technology, Jun. 2004, pp. 1-314, http://resenv.media.mit.edu/pubs/theses/sjmorrisSCDthesis.pdf.

D'Orazio, Broadcom's New GPS Chip Promises Improved Indoor Tracking, 50 Percent more Battery Life, The Verge, Mar. 21, 2012, http://www.theverge.com/2012/3/21/2890127/broadcom-gps-chip-indoor-positioning-bcm4752, Pages.

PCT International Search Report and Written Opinion of the International Searching Authority, PCT/EP2018/082870, dated Apr. 12, 2019, 11 pages.

* cited by examiner

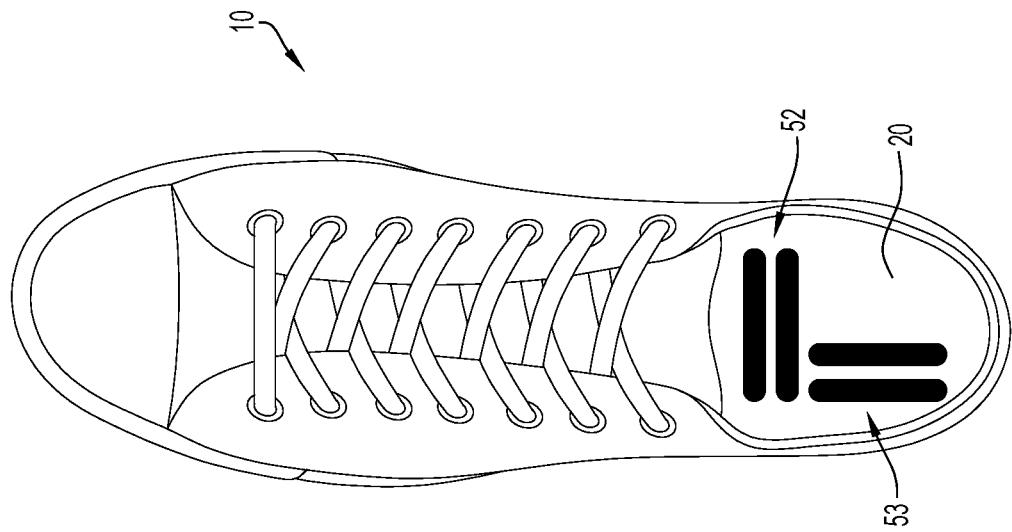
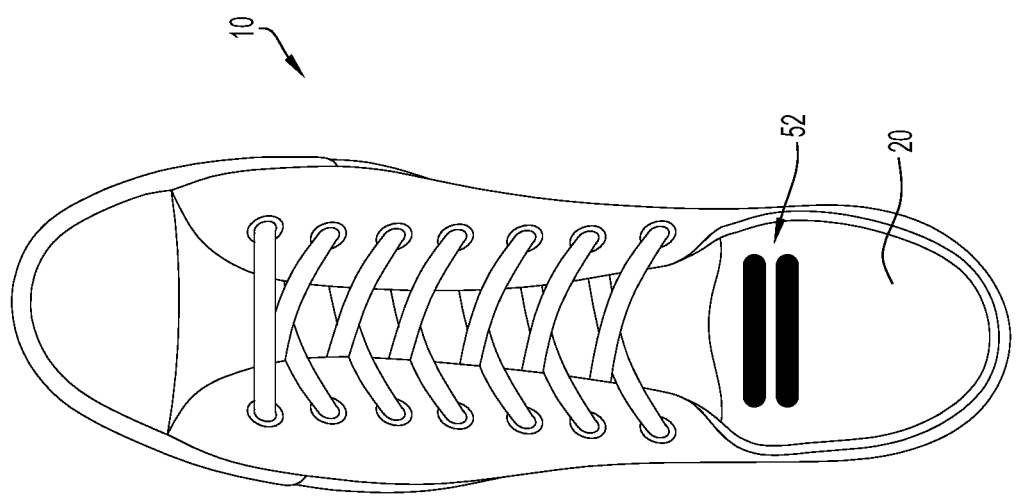

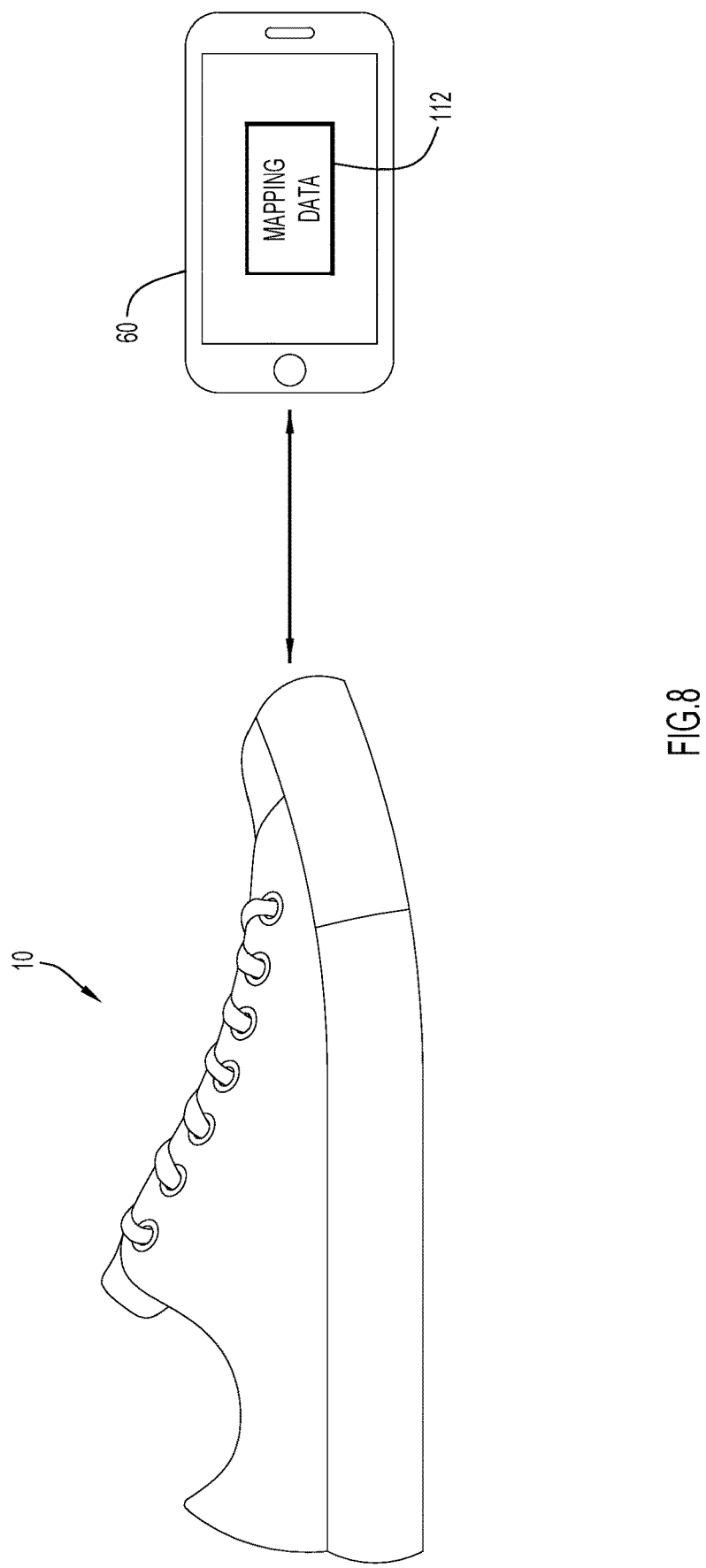

NAVIGATION USING MICROFLUIDICS

BACKGROUND

1. Technical Field

Present invention embodiments generally relate to navigation devices, and more particularly, to a navigation system fitted with microfluidics, a piezoelectric charger, and wireless connectivity with a mobile computing device sending walking navigation instructions to the navigation system. The navigation system uses microfluidics to indicate walking navigation instructions from the mobile computing device. Present invention embodiments may be utilized for guidance of visually impaired persons, and for monitoring a user's gait so the user can immediately take corrective action to alter his/her gait.

2. Discussion of the Related Art

Many navigation mobile applications exist which provide turn-by-turn walking directions. These applications permit users with a mobile computing device, such as a smartphone, to follow turn-by-turn directions displayed on their smartphone to reach a specified destination. However, a user's eyes typically must be focused on the screen of their smartphone in order to follow these directions. Users find the need to continuously glance down at their smartphone screens to be inconvenient and distracting since it takesaway from the enjoyment of seeing the surrounding environment, e.g., who and what are immediately around them. Moreover, users frequently find it hard to read directions from a mapping application on their smartphones in full sunlight.

To address these problems, solutions have been proposed that do not require users to look at the screen of their smartphone to follow navigation instructions. Typically, these solutions involve the use of haptic communication (haptics) which recreates the sense of touch by applying forces, vibrations, or motions to a user. For example, a mobile device, such as a smartphone or a smartwatch, may be used to provide haptic feedback for when a user should turn left or right by providing one type of buzzing or vibration for a left turn and another type of buzzing or vibration for a right turn. However, the buzzing or vibrating feedback has been found by users to be annoying at times. Moreover, the frequent buzzes and vibrations often lead to rapid draining of the mobile device's battery. This creates other problems since a convenient, nearby electricity power source may not be readily available to permit recharging of the mobile device's battery in a timely manner.

Other attempts to solve one or more of these problems using haptic solutions have employed haptic motors and/or actuators installed directly in footwear (e.g., shoes) to provide haptic sensations in the shoe for navigation purposes. The motors and actuators provide walking directions in the shoe by either buzzing/vibrating on either the left or right side of the shoe or delivering a toe-tickle to the toes of either the left or right foot to let users know which way to turn on a chosen route to reach a specified destination. While providing buzzing/vibrating/tickling feedback to the foot of a user may be sufficient to provide turn left/right instructional feedback, such feedback cannot provide precise shape/pattern recognition indicative of upcoming directional turns, obstacles, gradients, and route outline.

SUMMARY

According to embodiments of the present invention, position information is provided to a user by apparatus which includes a navigation system. The navigation system comprises a microfluidics system. The microfluidics system forms one or more projecting objects to indicate position information to a user. The navigation system may further include a communication device to communicate with a computing device, and a power source to provide power signals to the communication device and the microfluidics system.

In accordance with one embodiment of the present invention, the communication device preferably receives navigation information from the computing device and the microfluidics system preferably forms a projecting line to direct the user according to the received navigation information. Moreover, the microfluidics system preferably adjusts the projecting line based on a changing location of the user.

In accordance with certain embodiments of the present invention, the microfluidics system optionally forms different patterns within the line to indicate varying conditions along a path indicated by the navigation information, and the one or more projecting objects preferably indicate one of a desired direction, a location of a desired object and an obstacle.

In accordance with another embodiment of the present invention, the navigation system may optionally include one or more pressure sensors to measure pressure. When pressure sensors are disposed in the navigation system, the communication device preferably receives analysis of the pressure measurements from the computing device pertaining to a gait of the user, and the microfluidics system preferably forms one or more projecting objects at corresponding locations with improper applied pressure based on the analysis to enable correction of the gait.

As discussed below, embodiments of the present invention use a microfluidics system. Specifically, the microfluidics system of the present invention embodiments not only provides eyes-free navigation and precise shape/pattern recognition of upcoming directional turns, obstacles, gradients, and route outline, but eliminates the annoying buzzing and vibrating feedback associated with mobile devices and haptic motors/actuators. Moreover, eliminating the buzzing/vibration feedback from the mobile device provides the beneficial effect of lessening the likelihood the mobile device battery will quickly lose its charge; thereby reducing the need for frequent recharging. Present invention embodiments may be utilized for guidance of visually impaired persons, and for monitoring a user's gait so the user can immediately take corrective action to alter his/her gait.

Other features and advantages of the embodiments of the present invention presented herein will be apparent from the following detailed description taken in connection with the accompanying drawings.

BRIEF DESCRIPTION OF THE DRAWINGS

Embodiments of the present invention are described herein in conjunction with the accompanying drawings, in which:

FIGS. 7A-7B are top views illustrating microfluidic embossed lines projecting from the inner sole of the exemplary footwear item of FIG. 6 indicating examples of the presence of obstacles according to aspects of certain alternative embodiments presented herein.

FIG. 8 is a schematic diagram illustrating a navigation system including an exemplary footwear item providing specific direction/object position guidance information in accordance with certain alternative embodiments presented herein.

DETAILED DESCRIPTION

Figure 1:
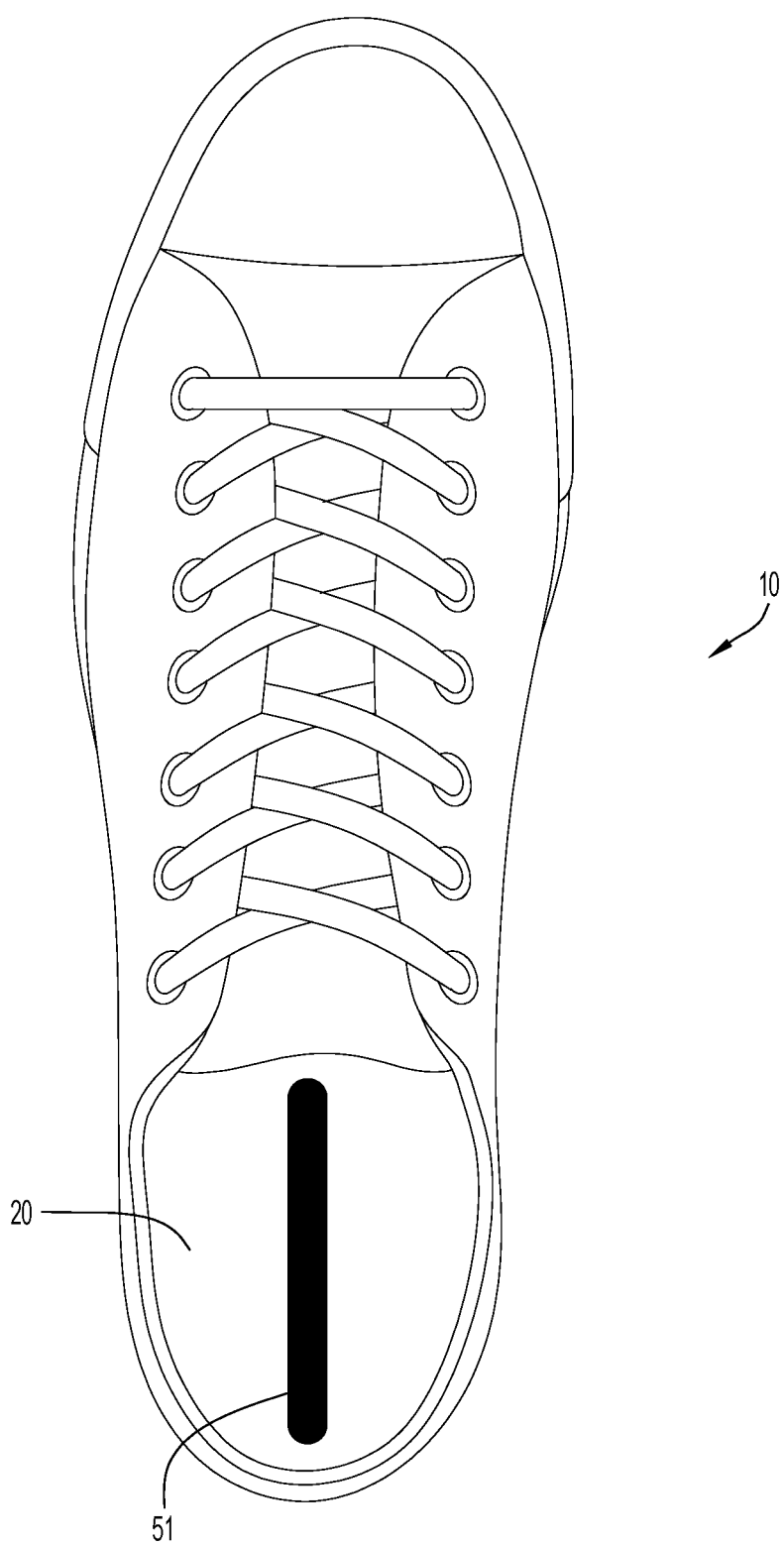
FIG. 1 is a top view illustrating an example of a microfluidics inner sole fitted within a navigation system including an exemplary footwear item in accordance with the general inventive concept presented herein.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

Figure 2:
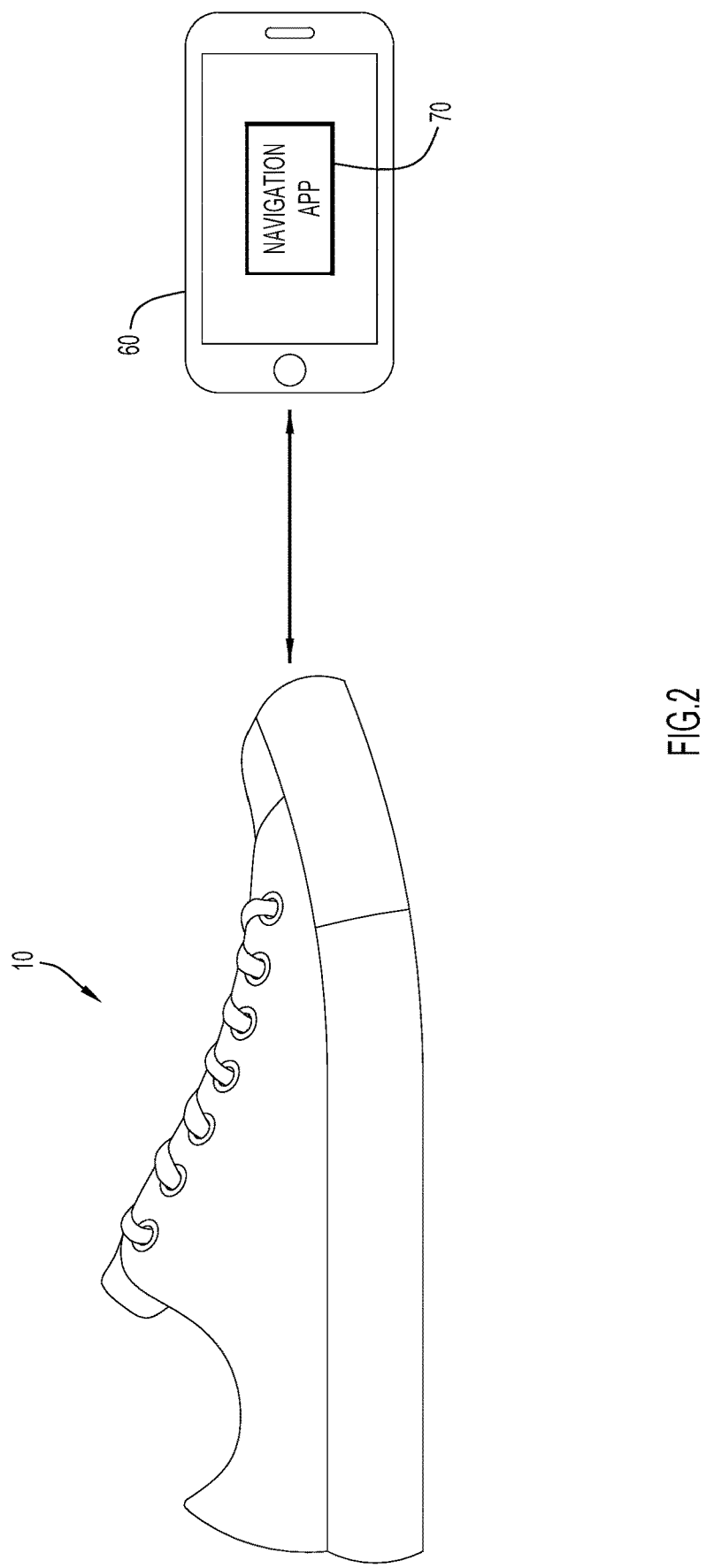
FIG. 2 is a schematic diagram illustrating exemplary apparatus providing position information according to certain embodiments presented herein.
Figure 3:
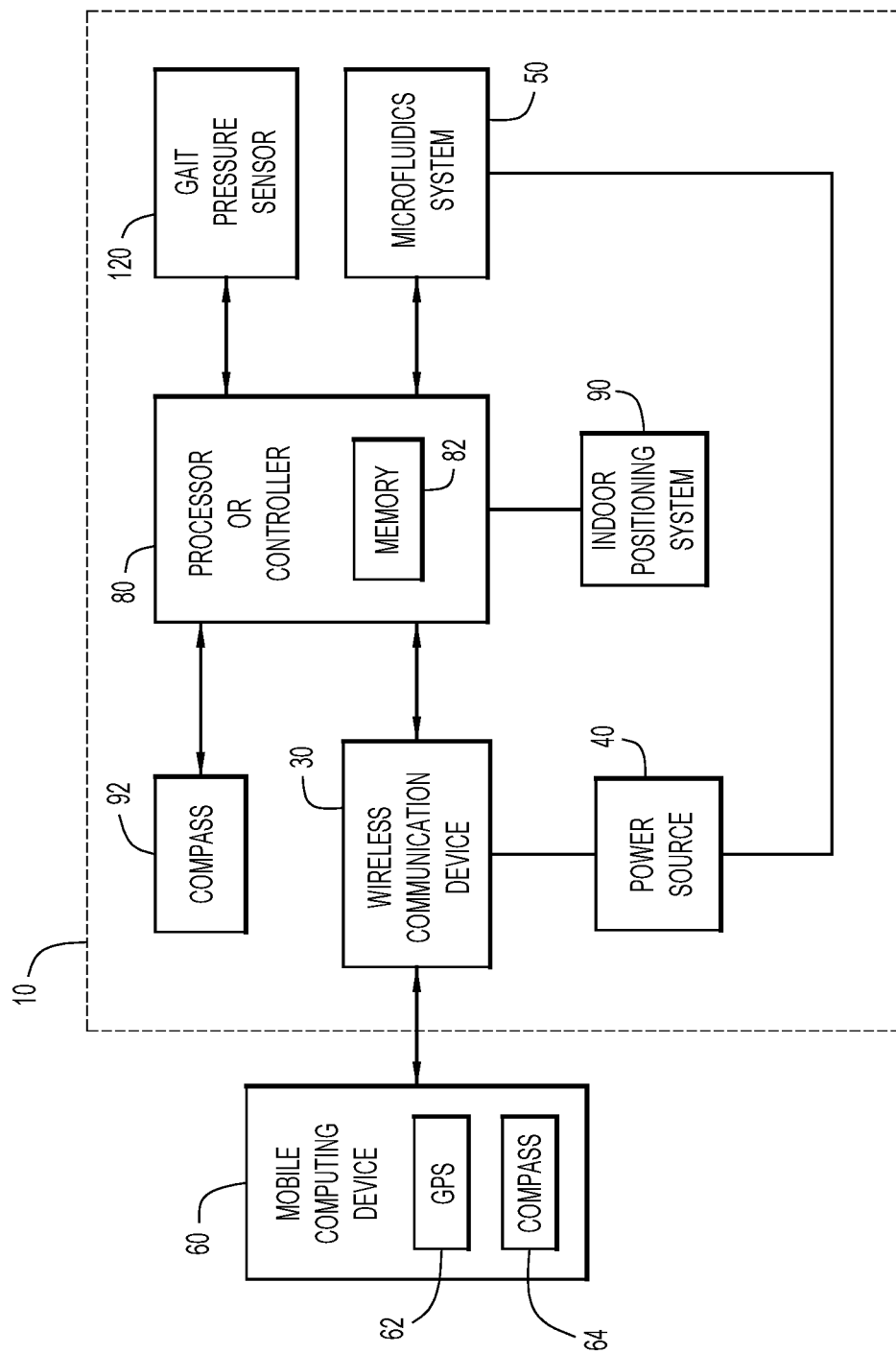
FIG. 3 is a block diagram illustrating exemplary components of the apparatus providing position information shown in FIG. 2 in accordance with certain embodiments presented herein.

With reference now to FIGS. 1-3, shown is an example navigation system including an exemplary footwear item 10 (hereafter also referred to as "footwear 10" or "footwear (shoe) 10" or "footwear" or "shoe") fitted with an inner sole 20, a communication device 30, a power source 40 and a microfluidics system 50 in accordance with certain embodiments presented herein. As shown by exemplary embossed line 51 in FIG. 1, the microfluidics system 50 (FIG. 3) is disposed in the inner sole 20 of the footwear. While embossed line 51 is shown as a straight line in FIG. 1, it should be appreciated that the shape and form of the microfluidic embossed line may vary depending on the desired position information to be conveyed.

The communication device 30 may be any suitable short-range wireless communication unit, such as a Bluetooth transceiver, that is in wireless communication with a network connected mobile computing device 60, e.g., a smartphone. The Bluetooth connectivity is typically paired with a smartphone running a navigation mobile application (app) 70, such as (but not limited to) Google Maps, to generate walking directions.

The power source 40 provides power signals to the communication device 30 and the microfluidic system 50. The power source is preferably, but not limited to, a piezoelectric charger. The piezoelectric charger may be fitted within footwear item (e.g., shoe) 10 and when mechanical pressure (i.e., load or stress) is applied to the footwear item (shoe) while walking, power (electricity) will be automatically generated for controlling the microfluidics based navigation system in the inner sole of the footwear item (shoe). The piezoelectric charger may comprise material, such as crystals and certain ceramics, which have properties that allow them to convert physical energy into electricity. Thus, each time a wearer of the footwear item (shoe) takes a step, the user's weight will push on and/or flex the piezoelectric material, which will then convert that energy into electricity. However, it should be appreciated that any other suitable low-cost piezoelectric transducer may be used to create the electrical power needed to control the microfluidics based navigation system.

The network connected mobile computing device 60 (e.g., smartphone) further includes a Global Positioning System (GPS) 62 and a compass 64 which provide location and direction of travel of a user (see FIG. 3). The mobile computing device 60 (e.g., smartphone), via the navigation mobile app 70, sends turn-by-turn walking navigation directions to footwear (shoe) 10, which are processed by processor 80 via one or more software modules and rendered as an embossed line 51 using the microfluidics in the inner sole (insole) of the shoe and interpreted as a navigation instruction by the user.

Figure 4:
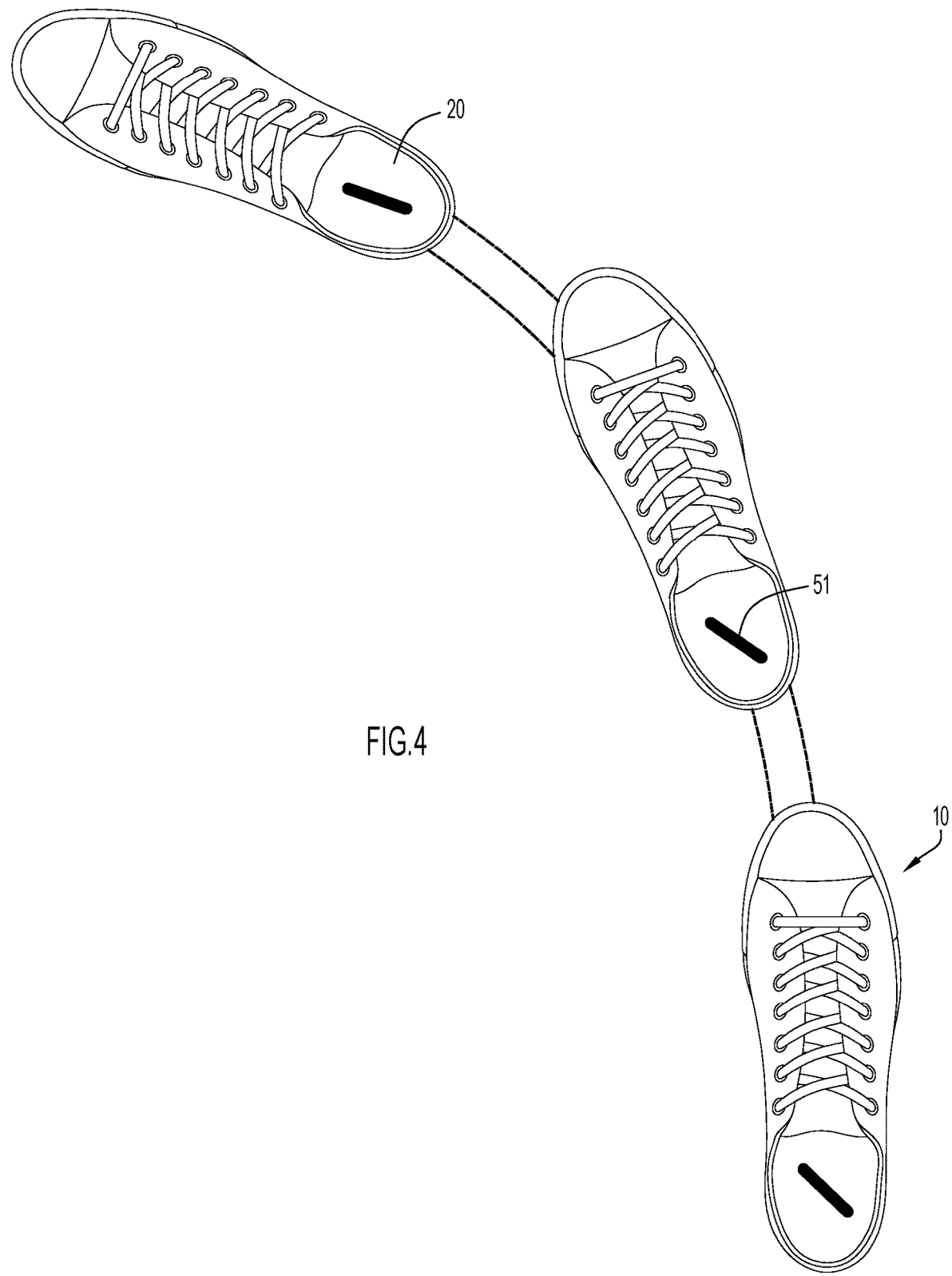
FIG. 4 is a schematic view from above illustrating a microfluidic embossed line projecting from the inner sole of the footwear item of FIG. 1 indicating exemplary turn direction information in accordance with aspects of certain embodiments presented herein.

Referring now to FIG. 4, the embossed line 51 created on the insole of footwear (shoe) 10 indicates which direction to turn by the angle of the line. When users begin walking, the navigation mobile app 70 tracks a user's location and direction of travel and, as the user is approaching a turn, the navigation app will send (for example, via Bluetooth wireless communication) a signal to a computing circuit (e.g., a circuit or processor/controller with software) 80 within footwear (shoe) 10 describing the degree to which the user must turn (e.g., turn 90 degrees to the left, 45 degrees to the right, and so forth). The processor/controller provides instructions (stored in memory 82) to microfluidics system 50 to form, for example, a line projecting slightly from the inner sole at an angle to indicate a 45 degree turn to the left is ahead, as shown in FIG. 4. Persons (users) wearing the footwear 10 of the present invention will feel on the sole (plantar aspect/plant) of their foot the inner sole raise slightly to indicate the specific direction to turn.

Returning to FIG. 4, the microfluidics system 50 in the inner sole (insole) 20 of shoe 10 can form an embossed line 51 set at an angle from the inner sole indicating the direction to turn (e.g., an embossed line angled left indicates a left turn left ahead, while an embossed line angled right indicates a right turn ahead). As the user turns, the navigation app 70 monitors the compass direction (direction of travel) and adjusts the direction of the microfluidic formed embossed line 51 accordingly. For example, the microfluidic embossed line in the embodiment of FIG. 4 is shown moving from a leftward pointing direction toward a more centered position on insole 20 as the user completes a left turn. Moreover, the navigation path created by the embossed line 51 on the inner sole of the footwear (shoe) may also be based on a user's walking speed and change of direction. However, it should be appreciated that other suitable criteria may be used to create the navigation path if so desired.

The computing circuit (e.g., processor/controller) 80 within footwear 10 is typically paired with the mobile device 60 (i.e. smartphone) such that the computing circuit can be trained automatically to provide an appropriate amount of embossing on the inward facing side of the shoe inner sole based on the sensitivity of a user's skin. Furthermore, the computing circuit (processor/controller) can provide a user with a pattern of embossed objects on the shoe insole to indicate various types of navigation path, as will be discussed below.

Thus, this embodiment of the present invention goes beyond the haptic communication (haptics) solutions described above. In the embodiment of the present invention shown in FIGS. 1-4, the navigation system providing position information uses microfluidic flow technology (i.e., the precise control and manipulation of fluids inside micrometer-sized channels etched or molded into glass, silicon or polymer material, such as PDMS, for PolyDimethylSiloxane, using flow control devices, such as channels, pumps, mixers and valves) to create an embossed (slightly raised) line in the inner sole of the footwear. The embossed line provides walking directions based on communication with a paired network connected mobile device (e.g., smartphone) running a navigation mobile application (app), such as Google Maps. The direction a user is to turn is indicated by the angle of the microfluidic embossed line. As mentioned previously, the angle of orientation of the embossed line is felt directly by users on the sole (plantar aspect/plant) of their foot.

The advantage of using the microfluidic embossed line haptic approach of the present invention is that it provides a more fine grained navigation instruction to a user than the simple "buzz or vibration to turn left or right" haptic approach described above. In addition, the apparatus of the embodiment presented herein enables other position information to be portrayed to a user, such as upcoming obstacles, gradients, and an outline of an upcoming section of the route, as will be discussed below. Further, the navigation system of the embodiment of the present invention in FIGS. 1-4 can be configured to adjust the microfluidic embossed line based on walking speed and change of direction, as well as skin sensitivity.

Figure 5A:
FIGS. 5A-5C are exploded perspective views illustrating examples of microfluidic embossed lines projecting from the inner sole of the footwear item of FIG. 1 indicating exemplary information about a selected route according to aspects of certain embodiments presented herein.
Figure 5B:
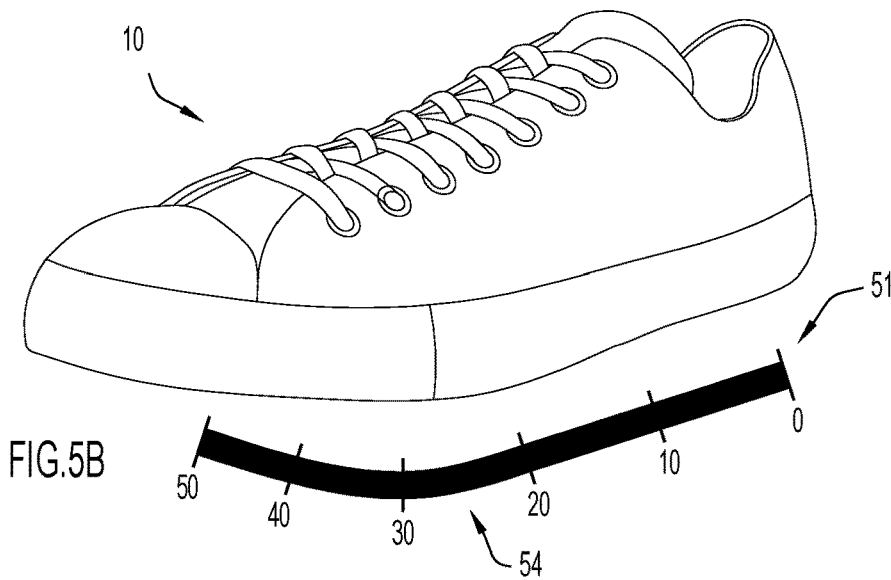
Figure 5C:

Referring now to embodiments of the present invention shown in FIGS. 5A-5C, the microfluidic embossed line 51 formed in inner sole (insole) 20 of footwear (shoe) 10, in addition to indicating direction of travel, may be further configured to convey other information about a selected walking route. For example, the microfluidic embossed line 51 may have a shape and form providing: information indicating upcoming obstacles along the route, such as a body of water or a street crossing ahead (FIG. 5A); information indicating an entire portion of an upcoming route to help a user visualize the route's configuration, and provide advance warning of route directional changes, such as left turn approximately thirty yards ahead (FIG. 5B); and information indicating the gradient of the route ahead, such as the upward or downward slope of an upcoming hill on the route (FIG. 5C).

Specifically, as shown in the FIG. 5A embodiment of the present invention, the embossed line 51 can, for example, have an elongated raised portion 53 followed by a plurality of spaced apart projecting objects 52 to signify to wearers (users) of shoe 10 that an obstacle, such as a body of water or street crossing, is located a short distance ahead. Similarly, as shown in the FIG. 5B embodiment of the present invention, the embossed line 51 can be configured to include, for example, a bend 54 to inform wearers of the shoes that the selected route curves left after approximately 30 yards. Further, as shown in the FIG. 5C embodiment of the present invention, the embossed line 51 can, for example, have an expanding width 55 to indicate to users of the shoes that they are approaching a hilly portion of the route.

Figure 6:
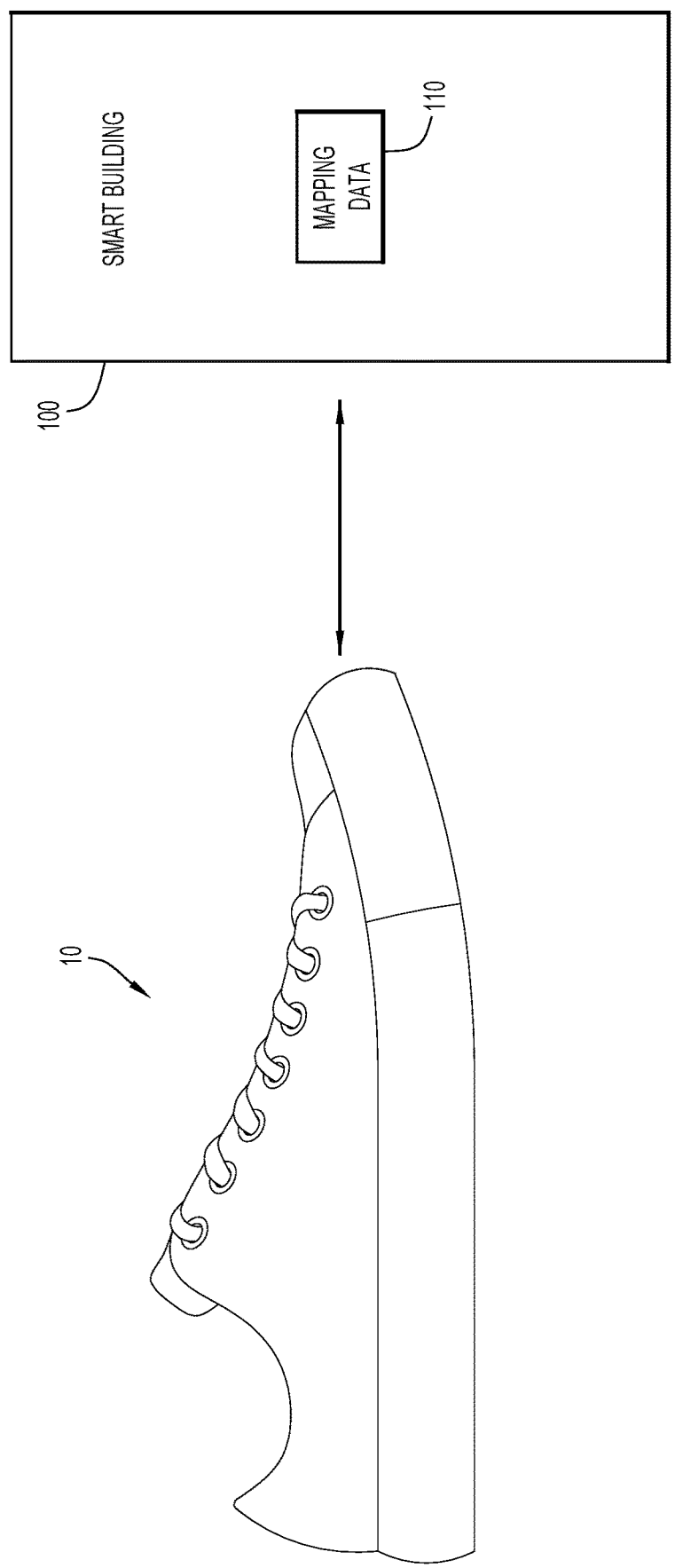
FIG. 6 is a schematic diagram illustrating a navigation system including an exemplary footwear item providing indoor guidance information inside a smart building in accordance with certain alternative embodiments presented herein.
Figure 9C:
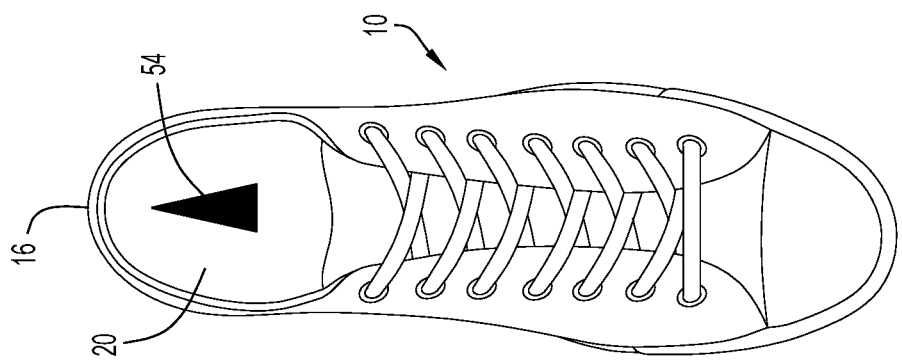
FIGS. 9A-9C are top views illustrating a microfluidic embossed line projecting from the inner sole of exemplary footwear item of FIG. 8 indicating examples of specific direction/object tracking information according to aspects of certain alternative embodiments presented herein.
Figure 9B:
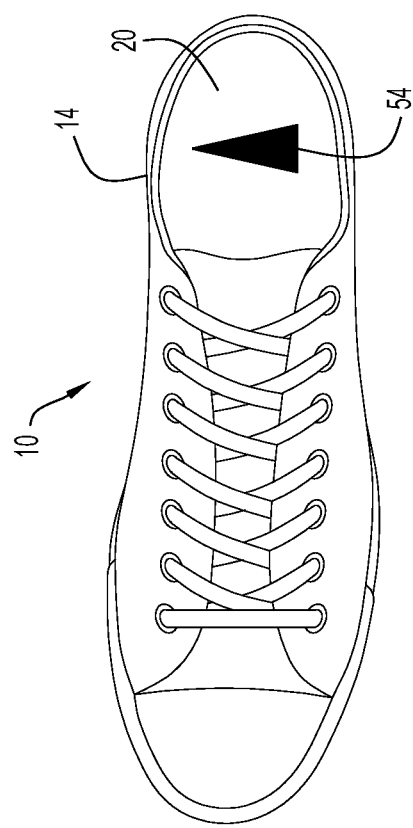
Figure 9A:
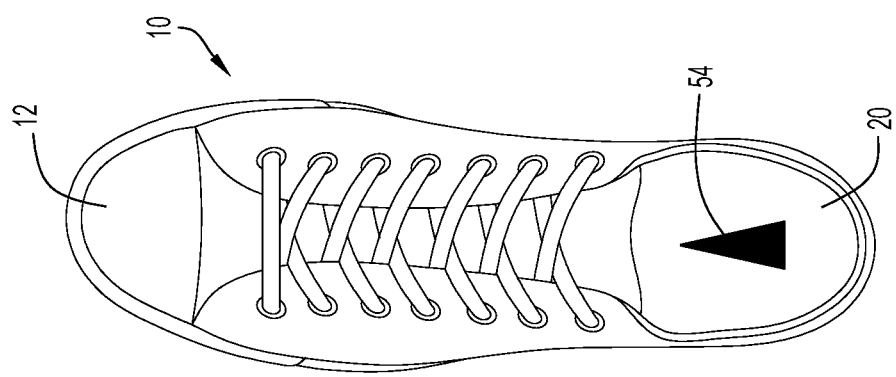
Figure 10:
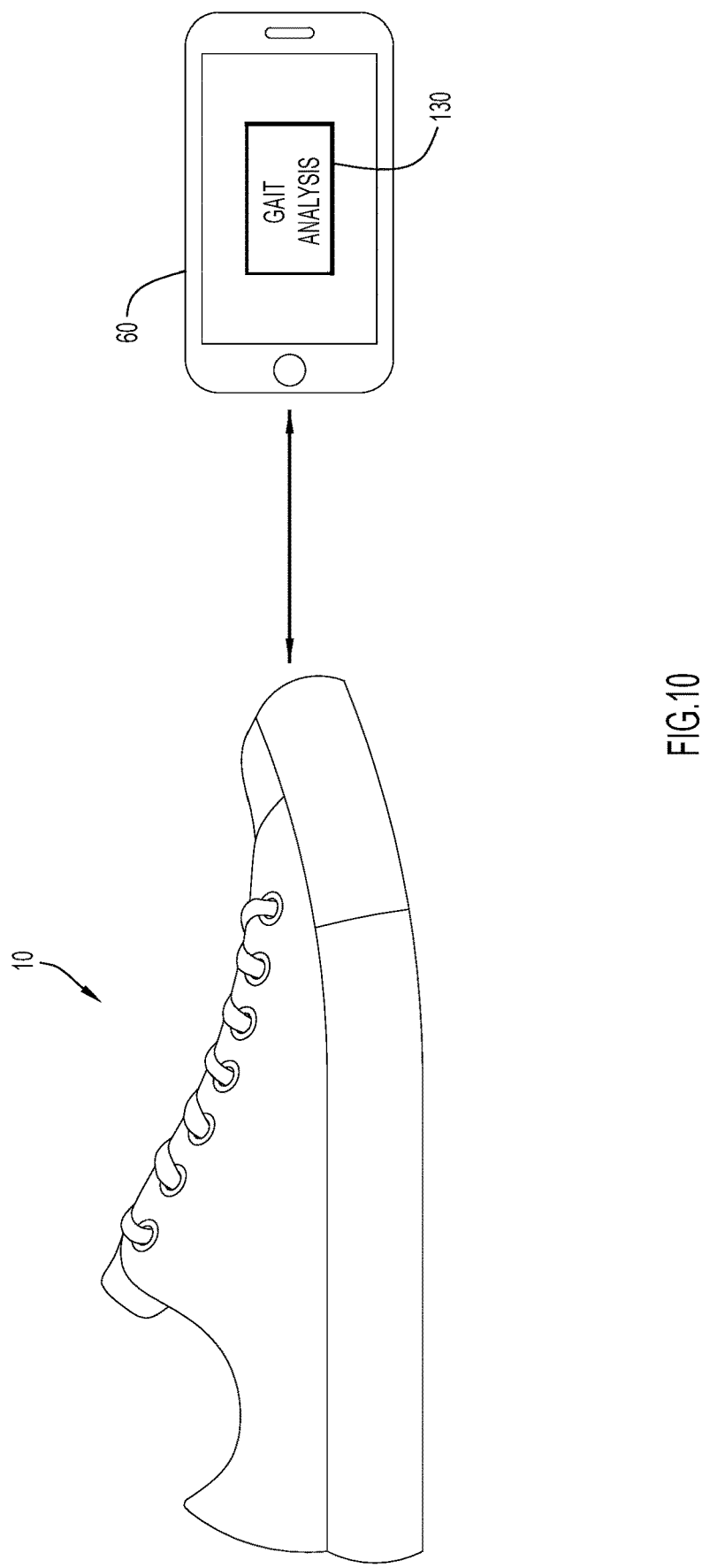
FIG. 10 is a schematic diagram illustrating a navigation system including an exemplary footwear item providing gait information in accordance with certain alternative embodiments presented herein.
Figure 11B:
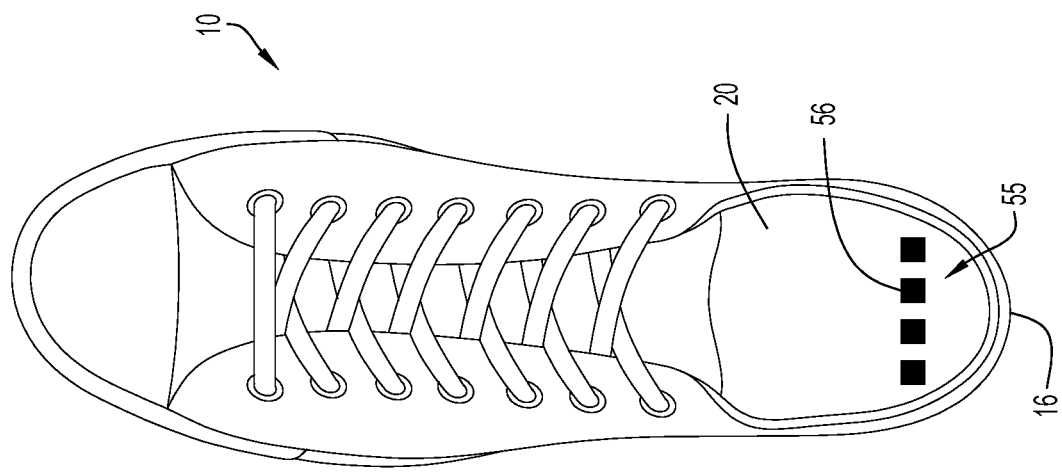
FIGS. 11A-11B are top views illustrating microfluidic embossed objects projecting from the inner sole of exemplary footwear item of FIG. 10 indicating examples of information relating to areas of incorrect pressure according to aspects of certain alternative embodiments presented herein.
Figure 11A:
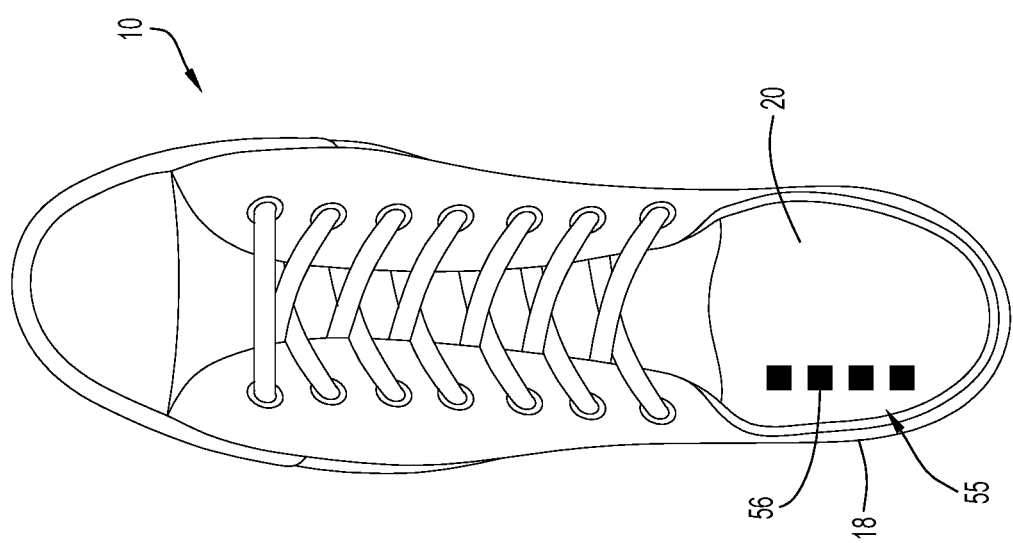

Referring now to FIGS. 6 and 7A-7B, FIGS. 8 and 9A-9C, and FIGS. 10 and 11A-11B, certain embodiments directed to health-related applications of the present invention are shown. Specifically, the embodiment of the present invention illustrated in FIGS. 6 and 7A-7B is generally directed to indoor guidance of visually impaired persons inside a Smart Building; the embodiment of the present invention illustrated in FIGS. 8 and 9A-9C is directed to specific positional guidance of visually impaired persons; and the embodiment of the present invention illustrated in FIGS. 10 and 11A-11B is directed to monitoring a user's gait.

With reference to the embodiment of the present invention generally directed to indoor guidance of visually impaired persons inside a Smart Building (FIGS. 6 and 7A-7C embodiment), the microfluidics embossed lines 52, 53 on inner sole 20 of exemplary footwear 10 (FIGS. 7A-7B) are used to guide visually impaired persons inside a Smart Building 100. The microfluidic embossed lines 52, 53 can provide directional walking guidance to visually impaired persons so they may avoid collisions with objects within the building.

The components used in this embodiment of the present invention are similar to those used in the embodiment of the invention shown in FIGS. 1-4, except an indoor positioning system (IPS) 90 is used instead of the Global Positioning System (GPS) used for outdoors navigation purposes (FIG. 3). In this embodiment, the IPS uses triangulation from Bluetooth beacons placed inside a Smart Building to provide location mapping data. However, in the alternative, the IPS can be a dedicated indoor positioning chip, such as, but not limited to, the Broadcom 4752 Indoor Positioning Chip, which supports low-power Bluetooth connectivity. The advantage of using a dedicated indoor positioning chip is that the chip has the ability to tie-in (i.e., communicate or integrate) with sensors of network connected mobile computing device 60 (i.e., smartphone), such as, for example, its gyroscope, magnetometer, accelerometer, and altimeter.

In the FIGS. 6 and 7A-7B embodiment of the present invention, the IPS 90 may be implemented in the following manner. Initially, footwear (shoe) 10 establishes a connection to Smart Building 100 over Bluetooth transceiver 30, either directly or through intermediate network connected mobile computing device 60 (e.g., a smartphone). Thereafter, the precise location of footwear 10 is determined by the IPS and communicated to the Smart Building. Once the information is communicated, the Smart Building uses the positioning information to guide a visually impaired person (user) safely through the building. More specifically, the Smart Building correlates a user's established position within the building to mapping data 110 of the building's layout, for example, but not limited to, two-dimensional (2D) and/or three-dimensional (3D) floor plans of the building, to provide walking direction and obstacle avoidance guidance.

When providing walking direction guidance, the embodiment of the present invention shown in FIGS. 6 and 7A-7B, uses network connected mobile computing device 60 (e.g., smartphone), via the navigation mobile application (app) 70, to send turn-by-turn walking navigation directions to footwear (shoe) 10. The directions are rendered as an embossed line 51 using the microfluidics system 50 disposed in inner sole 20 of the shoe and interpreted as a navigation instruction by the user in a manner similar to the embodiment of the present invention illustrated in FIGS. 1-4. However, where obstacle avoidance guidance is to be provided, the Smart Building 100 detects when a visually impaired person (user) is about to collide with an obstacle contained within the mapping data of the building layout (i.e., a wall, door, desk, shelf, etc.) and alerts the user through the microfluidic embossed (i.e., slightly raised) lines 52, 53 on the inner sole 20 of footwear (shoe) 10 of an obstacle ahead.

As specifically shown in FIGS. 7A-7B of the embodiment presented herein, horizontally disposed microfluidic embossed lines 52 may be used to alert a visually impaired person (user) wearing footwear 10 of the presence of an obstacle directly ahead (FIG. 7A), while a pairing of horizontally and vertically disposed microfluidic embossed lines 52, 53 may be used to alert a visually impaired user of the presence of an obstacle directly ahead, but to the left of the user's path of travel (FIG. 7B). While horizontal and vertical pairs of microfluidic embossed lines are shown in FIGS. 7A-7B and may be a preferred shape to indicate to a visually impair person that an obstacle lies ahead, it should be appreciated that other suitably configured microfluidic embossed line shapes/patterns could be used if so desired.

Again, the location and orientation of embossed lines 52, 53 in this embodiment of the present invention will be felt by wearers (users) of the footwear on the sole (plantar aspect/plant) of their foot and enable them to interpret the various line shapes/patterns to avoid a collision. For instance, the presence of microfluidic embossed vertical lines 53 on the left side of the inner sole, together with horizontal embossed lines 52, as illustrated in FIG. 7B, can be quickly interpreted by a user as "obstacle directly ahead and to the left." Similarly, the presence of microfluidic embossed vertical lines 53 on the right side of the inner sole, together with horizontal embossed lines 52 (not shown in FIG. 7B), can be quickly interpreted by a user as "obstacle directly ahead and to the right."

With reference to the embodiment of the present invention directed to specific positional guidance for visually impaired persons (FIGS. 8 and 9A-9C embodiment), the microfluidic embossed line 54 on inner sole 20 of footwear (shoe) 10 may have a unique configuration to guide a visually impaired person (user) in a specific direction or to a specific object. For example, a microfluidic embossed line may have a triangular shape, as illustrated in FIGS. 9A-9B, to always indicate the direction "North" or the direction to the nearest emergency exit in the case of a fire. However, it should be appreciated that any other suitably embossed line shape/configuration may be used instead of the triangular embossed line shape illustrated in this embodiment if so desired. Furthermore, as discussed in relation to the other embodiments of the invention presented herein, users wearing footwear (shoe) 10 will feel the triangular microfluidics embossed line shape 54 on the sole (plantar aspect/plant) of their foot and be able to interpret the direction of "North" or the direction to the nearest emergency exit.

The components used in this embodiment of the present invention are similar to those used in the embodiment of the present invention shown in FIGS. 1-4, except a compass 92 (see FIG. 3), which is embedded within footwear (shoe) 10, is used to indicate the direction the footwear (shoe) is facing. To implement the specific positional guidance feature of this embodiment, a user specifies a direction or object to be tracked, e.g., the direction "North" or the location of the closest emergency exit. The compass reading indicating the direction of the footwear (shoe) is transmitted to network connected mobile computing device 60 (e.g., a smartphone) using the paired communication device 30 (e.g., a Bluetooth transceiver). The mobile computing device 60 compares the compass reading with the direction/object to be tracked using mapping data 112. The mobile computing device 60 sends a signal back to footwear (shoe) 10, via communication device 30, and a microfluidic embossed line shape 54 is created in the inner sole (insole) of shoe 10 indicating the direction of "North" or the direction of the object to track. This process is continuously repeated so that each new compass reading results in an adjustment of the microfluidic embossed line shape to ensure that it is always pointing either in the direction of "North" or at the object being tracked.

Referring again to FIGS. 9A-9C, the microfluidic embossed triangular line shape 54 in the inner sole 20 of shoe 10 is shown pointing toward one of a direction "North" or an emergency exit sign (not illustrated) despite the fact that the toe of shoe 10 is facing in a different direction. Thus, in the FIG. 9A embodiment of the present invention, users will feel the triangular microfluidic embossed line shape 54 pointing forward toward toe cap 12 of the shoe and be able to determine that the direction of "North" or the object to be tracked is straight ahead. Similarly, in the FIG. 9B embodiment of the present invention, users will feel the triangular microfluidic embossed line shape 54 pointing toward the right side 14 of the shoe and be able to determine that the direction of "North" or the object to be tracked is to the right. Further, in the FIG. 9C embodiment of the present invention, users will feel the triangular microfluidic embossed line shape 54 pointing rearward toward heel portion 16 of the shoe and be able to determine that the direction of "North" or the object to be tracked is to back of them.

With reference to the embodiment of the present invention directed to monitoring a user's gait (FIGS. 10 and 11A-11B embodiment), one or more sensors 120 may be integrated into footwear (shoe) 10 to monitor a user's gait (FIG. 3). The one or more sensors record pressure on the insole of the shoe to obtain a user's gait. When an abnormality is detected, the user is alerted through the formation of an appropriately located microfluidic embossed line 55 in the inner sole (insole) 20 of footwear 10. The exact location of the microfluidic embossed line in the insole of the shoe indicates to a user the nature of the abnormality. Upon a user feeling the microfluidic embossed line on the sole (plantar aspect/plant) of his/her foot, the user can immediately take corrective action to alter his/her gait. Improving gait is important, for example, to both casual and serious runners looking to avoid a bad or improper running style, as well as to elderly persons where a poor gait may indicate an increased risk of falling which could result in serious injury.

The components used in this embodiment of the present invention are similar to those used in the embodiment of the present invention shown in FIGS. 1-4, except one or more gait sensors 120 (see FIG. 3) are imbedded within footwear (shoe) 10 to record pressure points on the insole of the shoe to derive a user's gait. The pressure point data recorded by the one or more sensors is sent to the network connected mobile computing device 60 (e.g., a smartphone), via communications device 30 (e.g., Bluetooth transceiver), where a gait analysis mobile application (app) 130 analyzes the current pressure point data and computes an optimal gait.

To implement the gait analysis feature of the embodiment shown in FIGS. 10 and 11A-11B, one or more gait sensors 120 embedded within footwear (shoe) 10 can be used to record the exact locations inside the shoe where pressure is being applied to the shoe's inner sole. The recorded data from the one or more gait sensors 120 is transmitted to mobile computing device 60 (e.g., a smartphone) using the paired communication device 30 (e.g., a Bluetooth transceiver) where it is analyzed by the gait analysis mobile app 130. The gait analysis mobile app determines where a user's gait is suboptimal and sends this data back to the footwear (shoe) via communication device 30 (e.g., Bluetooth transceiver). Upon receiving this data, footwear (shoe) 10 forms a microfluidic embossed (i.e., slightly raised) line shape 55 in the shoe's inner sole (insole) to indicate the areas where incorrect pressure is being applied. In this embodiment of the present invention, any conventional, commercially available pressure sensor suitable for integration within the footwear item, such as, but not limited to, a piezoelectric sensor, may be used to provide the necessary pressure data pertaining to the gait of the user.

Referring now to FIGS. 11A-11B, a microfluidic embossed line shape 55 is shown indicating the location where an incorrect amount of pressure is being applied. In FIG. 11A of the present invention, the microfluidic embossed line shape is defined by a plurality of spaced apart objects 56 projecting from the insole of shoe 10 adjacent the left side 18 of the shoe. The projecting objects 56 adjacent the shoe's left side, as shown in FIG. 11A, indicate that too much pressure is being applied to the left side of a user's foot. In FIG. 11B of the present invention, the microfluidic embossed line shape is defined by a plurality of spaced apart objects 56 projecting from the insole of shoe 10 adjacent a heel portion 16 of the shoe. The projecting objects 56 adjacent the shoe's heel portion, as shown in FIG. 11B, indicate that too much pressure is being applied to the heel of a user's foot.

In summary, the disclosed embodiments of present invention are directed to apparatus, as well systems and methods, providing navigation and position information. Each of the embodiments comprises a navigation system including a footwear item 10 having an inner sole (insole) 20 and a microfluidics system 50 disposed in the inner sole (insole) to form one or more projecting objects from the inner sole (insole) to indicate position information to a user. The footwear item further has a communication device 30 that communicates with a network connected mobile computing device 60 and a power source 40 to provide power signals to the communication device and microfluidics system. The communication device receives navigation information from the network connected mobile computing device, and the microfluidics system forms an embossed line projecting from the inner sole (insole) to direct the user according to the navigation information. The microfluidics system not only adjusts the embossed line based on a changing location of the user but forms different patterns within the line to indicate varying conditions along a path indicated by the navigation information. One or more projecting objects within the line may indicate one of a desired direction, a location of a desired object, an obstacle, and an entire portion of an upcoming route's configuration. The footwear item further includes one or more pressure sensors to measure pressure, wherein the communication device receives analysis of the pressure measurements from the mobile computing device pertaining to a gait of the user and the microfluidics system forms the one or more projecting objects at corresponding locations on the inner sole with improper applied pressure based on the analysis to enable correction of the gait.

It should be noted that not all of the above identified components are required for any particular embodiment of the invention presented herein. It should be further appreciated that within a pair of shoes, the various components may be deployed within one shoe or between both shoes. When components are distributed between two shoes or duplicated in both shoes, the components within the two shoes may communicate wirelessly, as appropriate and/or necessary.

It has also been contemplated that footwear (shoe) 10 in each of the embodiments presented herein may be wirelessly connected to another mobile computing device, such as a smartwatch, and, as such the combination of the smartwatch and footwear (shoe) 10 may provide various functions without the involvement of a conventional smartphone.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. An apparatus providing position information, comprising:
   a footwear item wearable by a user,
   the footwear item comprising:
      an inner sole to contact a user's foot; and
      a microfluidics system disposed in the inner sole and controlled by a processing device to form one or more embossed objects on the inner sole to indicate position information to a user;

wherein an angle of the one or more embossed objects on the inner sole is adjusted based on information from the processing device including a speed and a travel direction of the user to indicate to the user to change direction.

2. The apparatus of claim 1, wherein the footwear item further comprises:
a communication device to communicate with a computing device; and
a power source to provide power signals to the communication device and microfluidics system.

3. The apparatus of claim 2, wherein the communication device receives navigation information from the computing device, and the microfluidics system forms an embossed line on the inner sole to direct the user according to the navigation information.

4. The apparatus of claim 3, wherein the microfluidics system further forms different patterns within the embossed line to indicate varying conditions along a path indicated by the navigation information.

5. The apparatus of claim 1, wherein the one or more embossed objects have a configuration providing information indicating one of a desired direction, a location of a desired object, and an obstacle.

6. The apparatus of claim 2, wherein:
the footwear item further comprises one or more pressure sensors to measure pressure;
the communication device receives analysis of the pressure measurements from the computing device pertaining to a gait of the user; and
the microfluidics system forms an embossed line defined by a plurality of spaced apart projecting objects at corresponding locations on the inner sole with improper applied pressure based on the analysis to enable correction of the gait.

7. The apparatus of claim 3, wherein the processing device is trained to provide the embossed line on the inner sole with an amount of embossing based on a user's skin sensitivity.

8. The apparatus of claim 3, wherein the microfluidics system further forms the embossed line on the inner sole with different shapes to indicate varying conditions along a path indicated by the navigation information.

9. A system for providing position information, the system comprising:
a footwear item comprising a microfluidics system disposed in an insole of the footwear item and controlled by a processing device to form one or more embossed objects on the insole to indicate position information to a user;
a communication device comprising a wireless transceiver to communicate with a network connected mobile computing device to provide the position information to the microfluidics system; and
a power source to provide power signals to the wireless transceiver and microfluidics system,
wherein an angle of the one or more embossed objects on the insole is adjusted based on information from the processing device including a speed and a travel direction of the user to indicate to the user to change direction.

10. The system of claim 9, wherein the position information comprises navigation information, and the microfluidics system forms an embossed line on the insole to direct the user according to the navigation information.

11. The system of claim 10, wherein the microfluidics system forms different patterns within the embossed line to indicate varying conditions along a path indicated by the navigation information.

12. The system of claim 9, wherein the one or more embossed objects have a shape and form providing information indicating one of a desired direction, a location of a desired object, and an upcoming obstacle.

13. The system of claim 9, wherein:
the footwear item further comprises one or more pressure sensors to measure pressure;
the wireless transceiver receives analysis of the pressure measurements from the computing device pertaining to a gait of the user; and
the microfluidics system forms an embossed line defined by a plurality of spaced apart projecting objects at corresponding locations on the insole with improper applied pressure based on the analysis to enable correction of the gait.

14. The system of claim 9, wherein:
the power source comprises a piezoelectric charger that provides power when mechanical pressure is applied to the footwear item while walking, and
the wireless transceiver communicates with the network connected mobile computing device through Bluetooth connectivity.

15. A method for providing position information using a footwear item that includes a processor, a communication device comprising a wireless transceiver, and a microfluidics system disposed in an inner sole of the footwear item, the method comprising:
receiving, at the communication device, position information from a network connected mobile computing device;
transmitting, via the processor, the received position information to the microfluidics system;
forming, with the microfluidics system, one or more embossed objects on the inner sole to indicate the received position information to a user; and
adjusting, via the processor, an angle of the one or more embossed objects on the inner sole based on information from the processor including a speed and a travel direction of the user to indicate to the user to change direction.

16. The method of claim 15, wherein the position information comprises navigation information, and wherein forming, with the microfluidics system, one or more embossed objects on the inner sole further comprises:
forming an embossed line on the inner sole to direct the user according to the navigation information.

17. The method of claim 16, wherein forming, with the microfluidics system, an embossed line on the inner sole further comprises:
adjusting the embossed line on the inner sole based on a changing location of the user.

18. The method of claim 16, wherein forming, with the microfluidics system, an embossed line on the inner sole further comprises:
forming different patterns within the embossed line to indicate varying conditions along a path indicated by the navigation information.

19. The method of claim 15, further comprising:
indicating, with the one or more embossed objects on the inner sole, one of a desired direction, a location of a desired object, and an obstacle.

20. The method of claim 15, wherein the footwear item further includes one or more pressure sensors to measure pressure; and wherein the method further comprises:
    receiving, with the communication device, analysis of the pressure measurements from the computing device pertaining to a gait of the user;
    transmitting, via the processor, received gait position information to the microfluidics system; and
    forming, with the microfluidics system, an embossed line defined by a plurality of spaced apart projecting objects at corresponding locations on the inner sole with improper applied pressure based on the analysis to enable correction of the gait.

\* \* \* \* \*